US006887709B2

(12) United States Patent
Leong

(10) Patent No.: US 6,887,709 B2
(45) Date of Patent: May 3, 2005

(54) DEVICES, SYSTEMS AND METHODS FOR THE CONTAINMENT AND USE OF LIQUID SOLUTIONS

(75) Inventor: Koon-wah Leong, Sunnyvale, CA (US)

(73) Assignee: LifeScan, Inc., Milpitas, CA (US)

( * ) Notice: Subject to any disclaimer, the term of this patent is extended or adjusted under 35 U.S.C. 154(b) by 0 days.

(21) Appl. No.: 10/143,201

(22) Filed: May 9, 2002

(65) Prior Publication Data

US 2003/0211616 A1 Nov. 13, 2003

(51) Int. Cl.[7] ............................ G01N 31/00; B01L 3/00

(52) U.S. Cl. ............................ 436/8; 436/174; 422/61; 422/99; 422/102

(58) Field of Search ......................... 436/8, 14; 422/61, 422/99, 102, 939, 940, 942, 944, 948; 435/287.6, 288.4

(56) References Cited

U.S. PATENT DOCUMENTS

RE29,725 E * 8/1978 Johnson et al. ............... 435/12
4,116,336 A * 9/1978 Sorensen et al. ........ 206/524.8
4,588,554 A * 5/1986 Kaartinen et al. ............ 422/61
4,678,092 A 7/1987 Rane
4,678,754 A * 7/1987 Hoskins ....................... 436/15
4,750,318 A * 6/1988 Matsuzawa .................. 53/559
4,769,261 A 9/1988 Hazelton et al.
4,960,708 A * 10/1990 Zowtiak et al. ............... 436/11
4,965,047 A * 10/1990 Hammond ................... 422/58
5,187,100 A 2/1993 Matzinger et al.
5,272,093 A 12/1993 Silva et al.
5,290,518 A * 3/1994 Johnson ....................... 422/58
5,343,672 A * 9/1994 Kearney et al. .............. 53/440
5,542,236 A * 8/1996 Miller ......................... 53/467
5,605,837 A 2/1997 Karimi et al.
5,780,302 A * 7/1998 Conlon et al. ................. 436/8
6,287,612 B1 9/2001 Mandava et al.
6,451,606 B1 * 9/2002 Konig et al. ................... 436/8
2002/0078947 A1 * 6/2002 Gumaste ................ 128/200.14
2002/0168290 A1 * 11/2002 Yuzhakov et al. ............ 422/56

FOREIGN PATENT DOCUMENTS

EP 467172 * 1/1992

* cited by examiner

*Primary Examiner*—Maureen M. Wallenhorst
(74) *Attorney, Agent, or Firm*—Carol M. LaSalle; Bozicevic, Field & Francis, LLP

(57) ABSTRACT

The present invention includes devices, systems and methods for containing and using liquid solutions. The devices include liquid containment structures and packages of such liquid containment structures for containing single doses of a liquid solution for subsequent use. The systems include at least one subject containment structure or package of containment structures and the liquid solution for which they are intended to contain. The liquid solutions may comprise any type of agent, reagent or control solution. The subject methods involve the use of the liquid containment structures and packages thereof as well as methods of providing a control solution for use to evaluate a system's performance.

23 Claims, 6 Drawing Sheets

DEVICES, SYSTEMS AND METHODS FOR THE CONTAINMENT AND USE OF LIQUID SOLUTIONS

FIELD OF THE INVENTION

This invention generally relates to the single-dose packaging of liquid solutions and substances.

BACKGROUND OF THE INVENTION

In many medical and laboratory applications, it is necessary to provide or administer a single-dose or an exactly measured dose of a liquid agent, e.g., medication, and reagents, e.g., control solutions for evaluating diagnostic systems. Particularly in laboratory applications and in certain medical applications involving diagnostic tests, reagents are required to be provided in very precise amounts in an assay process. For such purposes, certain agents and reagents are provided in containers or packages which hold only a single dose of liquid or which provide for the delivery of only a single dose from a multi-dose volume of liquid.

One such application in which precise amounts of reagent fluid are required is in the fabrication and patient use of systems for measuring analyte, e.g., glucose, cholesterol, drugs, etc., concentrations in a physiological fluid, e.g., blood, interstitial fluid, urine, saliva, etc. Such systems typically include test strips containing a reagent material to which a physiological sample applied and meters configured for receiving such test strips and determining the target analyte concentration of the sample. During the manufacturing and fabrication of the test strips, the strips are typically quality control checked by batch sampling methods in which a monitoring agent, often called a control solution, formulated to mimic blood is used to test the accuracy and efficacy of the test strips. Examples of such control solutions are disclosed in U.S. Pat. Nos. 5,187,100 and 5,605,837. The accuracy of test strip meters is also checked during the manufacturing process by using the meter with test strips known to meet quality control standards and having such a control solution applied to them.

Such quality control of test strips and meters is similarly performed directly by the patient or user of such meters and test strips as well as medical personnel treating such a patient. The patient or medical worker is supplied with a control solution, such as when receiving a meter, obtaining a new package of test strips or independently of either, and is typically instructed to perform a quality control check upon the occurrence of any of the following events: opening a new package of test strips; using a new meter; when training or learning to use the meter and test strips; after the meter is dropped or the like; when the analyte measurement results do not reflect how the patient is currently feeling, e.g., when a glucose measurement result indicates a substantially high level of blood glucose level but the patient is feeling quite normal; or when a glucose measurement result is normal but the patient is feeling sick, etc. Control results which fall outside an expected range may indicate: user procedural error; a dirty meter or test strip container; test strip contamination, deterioration, damage or expiration; meter malfunction; control solution expiration; and/or a control solution which is outside of an acceptable temperature range, etc.

The above-described control solutions are typically packaged in a plastic container or a glass vial. The dispensing end of these containers is typically configured with a small opening at the end of a taper through which a relatively imprecise droplet of control solution can be dispensed by squeezing the bottle. An example of a control solution container 2 commonly used in diagnostic assay applications, particularly in blood glucose monitoring and the like, is illustrated in FIG. 1. Container 2 holds a volume of liquid control solution, typically having a volume of about 3 to 5 ml, which provides about 100 to 200 dosages which typically lasts about 3 months. Container 2 has a body 4 and a cap 6 which screws or snaps onto body 4. To apply the control solution, cap 6 is removed and container body 4 is tilted so that that its dispensing portion is held several millimeters over a test strip's reagent area. The user then applies a slight squeeze pressure to container body 4 to dispense a droplet of the control solution onto the reagent area. Such a container and the steps for dispensing control solution from the container have their drawbacks. First, the container is repeatedly opened over an extended period of time, thereby repeatedly exposing the control solution to contaminants in the air and on surfaces, such as the user's fingers, which carry contaminants. Because the users of such control solutions often have poor dexterity (such as diabetics), the user frequently fumbles the cap and may drop it which may further contaminate the solution. Such contamination can cause erroneous analyte test results. If it is determined that the control solution has become contaminated the entirety of the control solution must be thrown away, and a new container opened which can become costly. Moreover, when this happens, a new container of control solution may not be readily available to the user, possibly leaving him or her in a medically risky situation. Furthermore, such prior art control solution containers are problematic in that, because such a relatively large volume of the control solution is provided, the efficacy of the control solution may expire well before a majority of the control solution is used, which also adds to the cost of treating the patient. The shelf-life of the control solution sealed within its original containment is usually about 1 to 2 years, but once the user opens the solution container, the shelf-life quickly drops to only a few months due to the contamination problem mentioned above. Also, the user may forget to replace the cap on the container causing the control solution to evaporate thereby changing the analyte concentration which results in erroneous values. Additionally, it is difficult to precisely and accurately dispense the requisite volume of the control solution from within such prior art containers. The volume dispensed is highly user dependent in that the user may apply too much control solution by over-squeezing the container or may apply too little solution by not squeezing enough.

There is yet another drawback of prior art control solution dispensers: while advancements are rapidly being made in the development of systems and devices for measuring analyte concentrations, there has been limited advancement in the area of control solution containment and dispensing for use with these advanced systems and devices. In particular, advancements have been made in minimizing the pain experienced by the patient in obtaining a sample of blood or interstitial fluid as well as in minimizing the time and the number of steps necessary to carry out a glucose concentration measurement. The former has been accomplished by reducing both the sample volume size necessary to effect an accurate analyte measurement and the size of the needle for obtaining the sample fluid. The latter has been realized by the integration of various components used for the measurement process. Specifically, microneedles are now being integrated with test strips, such as those described in U.S. patent application Ser. Nos. 09/923,093 and 10/143

399 filed on the same day herewith, which are herein incorporated by reference. In these tester devices, the integrated needle/test strips include a capillary channel which extends from an opening in the distal tip of the microneedle to the sensor reagent area or matrix area within the test strip. Additionally, in certain of these embodiments, the tester is partially dispensed from the meter in an automatic or semi-automatic manner for accessing and collecting the sample fluid, yet remains electrically or photometrically (as the case may be) in contact or engaged with the meter during such fluid access and collection, thereby obviating the need for the user to handle the test strip. An example of such a meter is described in U.S. patent application No. 10/142,443 filed on the herewith, which is herein incorporated by reference.

This configuration clearly saves time and reduces the risk if injury to the patient and contamination to the strip and meter. As such, in a single step, physiological fluid can be accessed (by penetrating the skin with the microneedle), transferring only the minimum amount of sample necessary to the sensor (by means of the capillary channel) and determining the target analyte concentration within the sample (by means of the engaged meter).

In order to evaluate the performance of such an integrated system, the meter is equipped with “on board” diagnostic electronics and software, and a control solution is provided, as described above with respect to FIG. 1 or the like, for testing the efficacy of the test strip’s sensor. While the prior art control solution dispensers can be used in this case to evaluate the test strips by dispensing a droplet of control solution on to the designated sensor area of the test strip as mentioned above, there is no provision for evaluating the effectiveness of the integrated microneedle. One could deposit a droplet of control solution onto a sterilized substrate and position the microneedle tip within the droplet to evaluate the effectiveness of the capillary channel; however, such requires an additional component and additional steps with a very high risk of contamination of the control solution if the substrate is not adequately sterilized. Even if a sterile substrate can be ensured, there is no means to truly mimic operating conditions wherein the needle is dispensed in a manner to penetrate the skin surface and wick accessed fluid there beneath. More specifically, factors like the needle’s ability to penetrate skin or the like at the speed, angle and depth as is provided under actual operating conditions, the needle’s tip strength and the needle’s ability to provide suitable capillary action to fluid from within a solid medium are unable to be evaluated.

As such, there is a need for an improved means of containing and dispensing control solutions and other reagents and agents for single-dose usage. Of particular interest would be the development of a control solution containment structure which provides very accurate and repeatable single-doses; prevents against the contamination of unused control solution; minimizes the risk of user contact with the dispensed solution; provides a practical number of single-dose units, for example, for a single user over a given time period or for short-term mass use by a large number of users such as in a hospital or clinic; facilitates maximizing the shelf life and efficacy of the control solution; provides quality control assessment of a plurality of aspects of integrated test systems; is easy and convenient to use and store; and is cost effective to manufacture and store.

Of course, such features and advantages may be present in the subject invention in varying degrees. It is intended that, in one way or another, the invention is of assistance in reducing barriers to patient self-monitoring and therefore result in improved outcomes in the management of disease, such as diabetes.

SUMMARY OF THE INVENTION

The present invention includes devices, systems and methods for containing and using liquid solutions. The subject devices include novel liquid containment structures and packages of such liquid containment structures for containing single doses of a liquid solution for subsequent use. The subject systems include at least one subject containment structure or package of containment structures and the liquid solution for which they are intended to contain. The liquid solutions may comprise any type of agent, reagent or control solution. The subject methods involve the use of the subject devices and systems.

The present invention is particularly suitable for use with control solutions used for the periodic evaluation of a system which is used to analyze physiological or biological fluids. The control solutions are chemically configured to mimic the particular fluid for purposes of the evaluation. One particularly suitable application of the present invention is in the field of blood glucose determination in both institutional, e.g., clinical or hospital, settings, and for home use by the diabetic patient.

These and other objects, advantages, and features of the invention will become apparent to those persons skilled in the art upon reading the details of the methods and systems of the present invention which are more fully described below.

BRIEF DESCRIPTION OF THE FIGURES

To facilitate understanding of the description, the same reference numerals have been used (where practical) to designate similar elements that are common to the Figures. Some such numbering has, however, been omitted for the sake of drawing clarity.

DETAILED DESCRIPTION OF THE PREFERRED EMBODIMENTS

Figure 1:
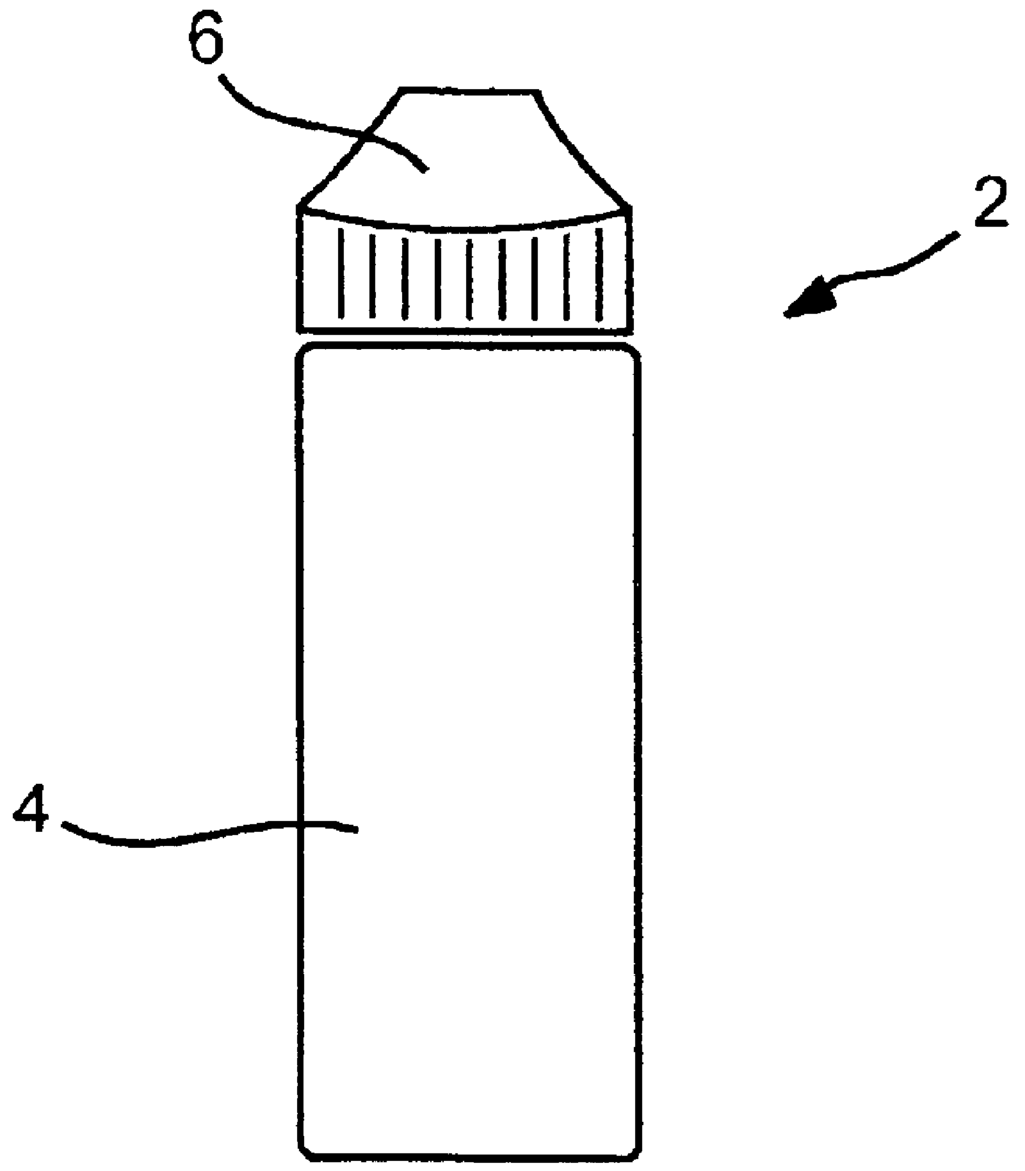
PRIOR ART FIG. 1
FIG. 1 illustrates an example of a prior art container used for containing and dispensing a control solution.

Before the present invention is described in such detail, it is to be understood that this invention is not limited to particular variations set forth herein as various changes or modifications may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "and," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

In describing the subject invention, the terms "liquid" and "fluid" may be used interchangeable herein; the term "agent" as used herein means any substance, compound or solution which, when in liquid form, may be contained within the containment structure or package of the present invention; the term "reagent" as used herein means a substances or solution (or agent) used to produce a characteristic reaction in a chemical analysis; the term "control solution" as used herein means an artificial physiological sample containing the analyte of interest used in a diagnostic application; and the terms "package," "packet" and "pack" may be used interchangeably herein and, as used herein, refer to two or more of the "containment structures" of the present invention in a packaged form or format.

In further describing the invention, the subject devices, i.e., liquid containment structures and liquid containment packs, and subject systems, i.e., the subject devices and contained liquid solutions are described first, followed by a description of the methods of fabricating the subject devices. Next, a description of the subject methods of using the subject devices and systems is provided. Finally, a review of the kits of the present invention which include the subject devices and systems is provided.

In the following description, the present invention will be described in the context of analyte concentration measurement applications, and particularly in the context of glucose concentration in blood or interstitial fluid; however, such is not intended to be limiting and those skilled in the art will appreciate that the subject devices, systems and methods are useful in the measurement of other physical and chemical characteristics, e.g., blood coagulation time, blood cholesterol level, the existence of legal or illegal drugs, etc. of other biological substances, e.g., urine, saliva, etc., involving the use of a reagent. Likewise, the devices, systems and methods of the present invention are useful in applications using other types of substances or agents which require the convenient provision of a precise dose of such substances or agents.

Subject Devices

As mentioned above, the devices of the present invention are a liquid containment structure and a liquid containment pack for containing a liquid solution for subsequent use. Both configurations are described below as well as the materials and fabrication techniques for them.

Liquid Containment Structures

Figure 6:
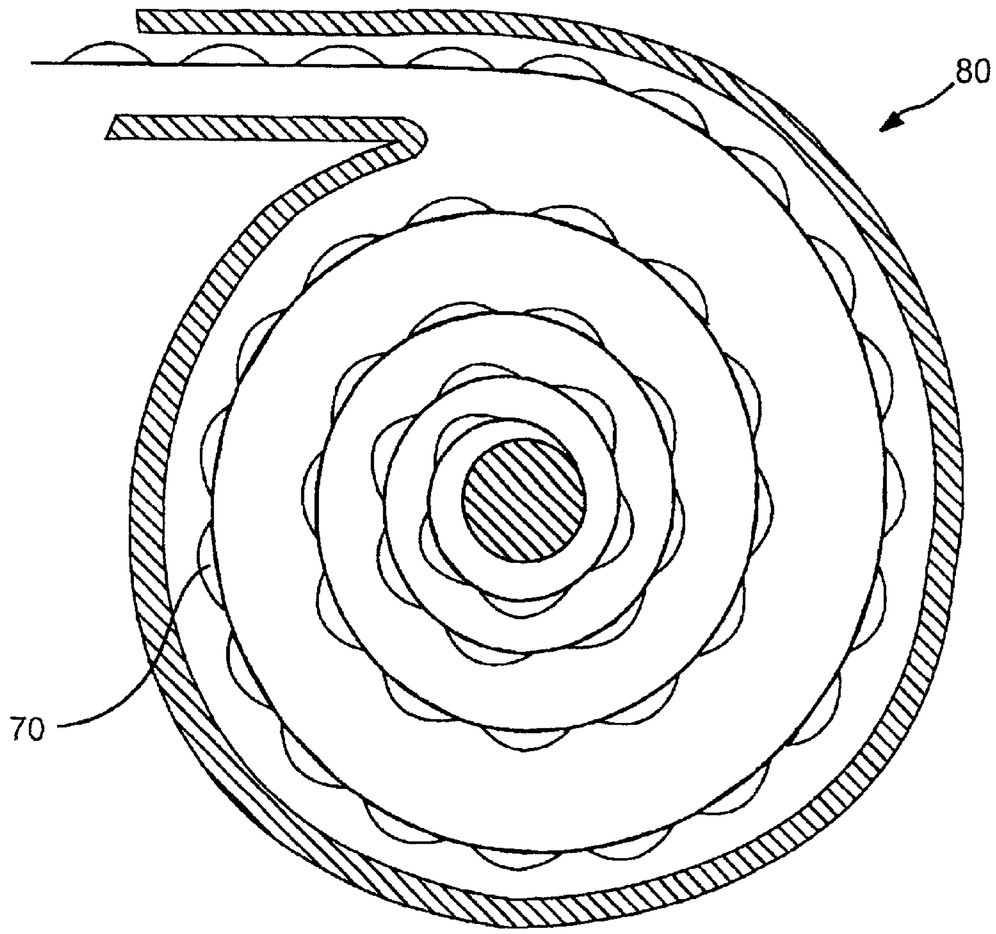
FIG. 6 illustrates a cross-sectional view of a dispenser for use with the liquid containment structure pack of FIG. 5C.

Referring now to the drawings, FIGS. 2, 3 and 4 illustrate various embodiments of the liquid containment structures of the present invention. Each of the illustrated liquid containment structures is configured to contain a single dose of a liquid, such as a reagent or control solution, in a sealed, portable format. The containment structures may be provided individually as singular units or, as will be described in greater detail below, collectively in any number, i.e., two or more, as part of a pack or package where the individual containment structures are contiguous with each other, as illustrated in FIGS. 6A, 6B and 6C. In certain embodiments of the subject packages, the contiguous containment structures are easily separable from each other. Some of these liquid containment packages are further adapted to be loaded into a dispenser from which containment structures may be individually or collectively dispensed.

Figure 2A:
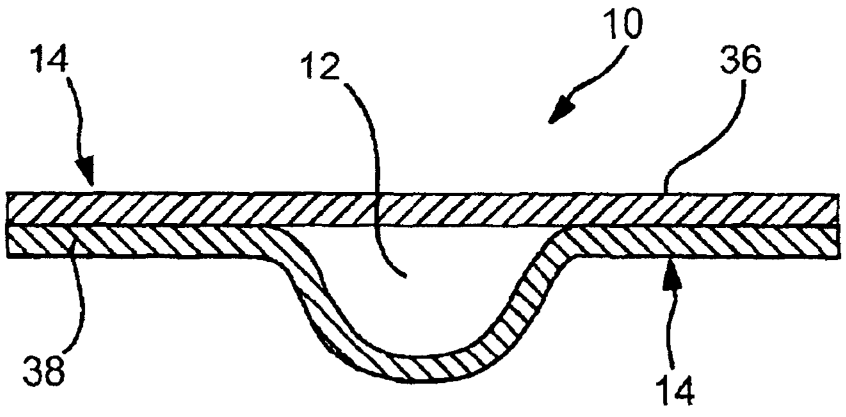
FIGS. 2A and 2B are cross-sectional and planar views, respectively, of one embodiment of the liquid containment structure of the present invention having a single-sided, circular reservoir configuration.
Figure 2B:
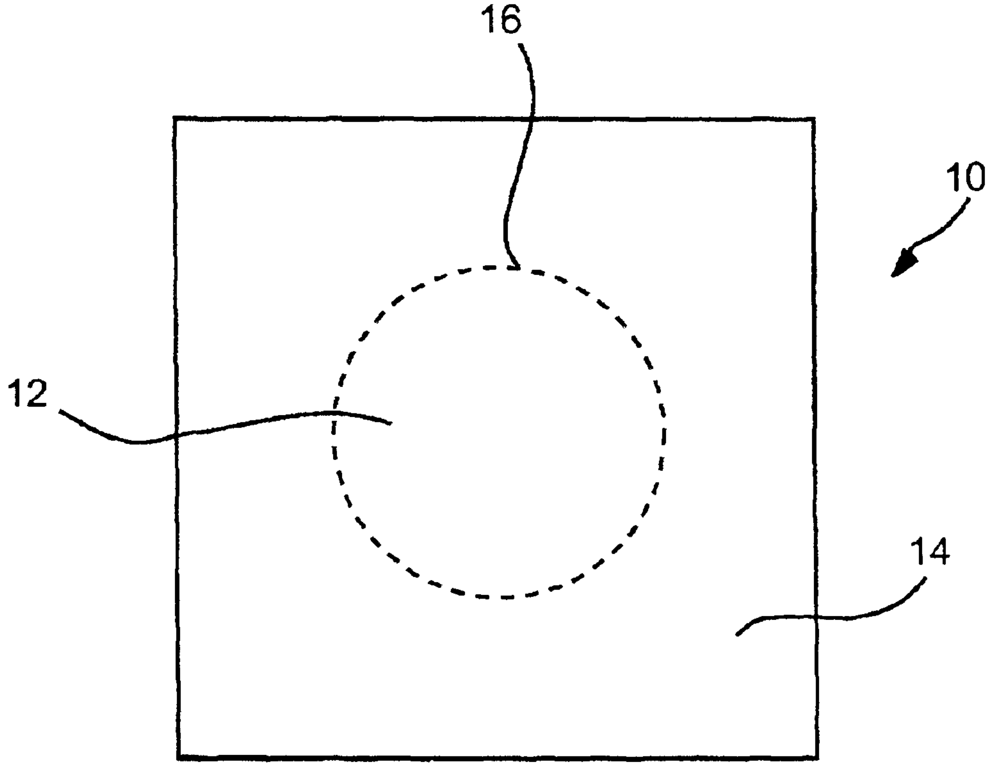
Figure 3A:
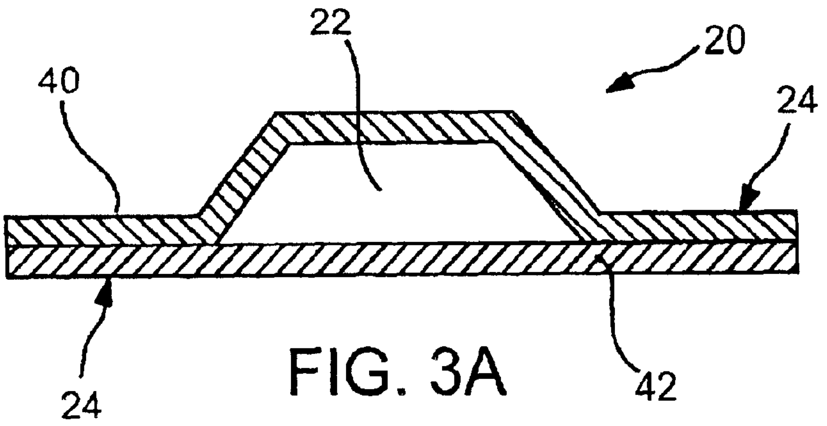
FIGS. 3A and 3B are cross-sectional and planar views, respectively, of a second embodiment of the liquid containment structure of the present invention having a single-sided, square reservoir configuration.
Figure 3B:
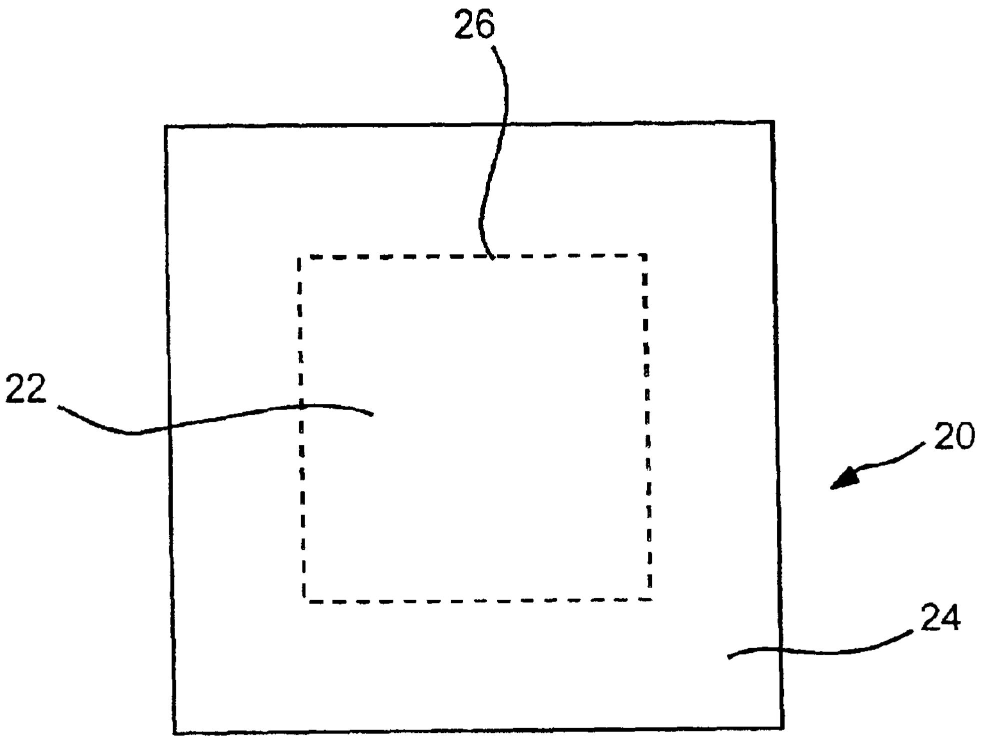
Figure 4A:
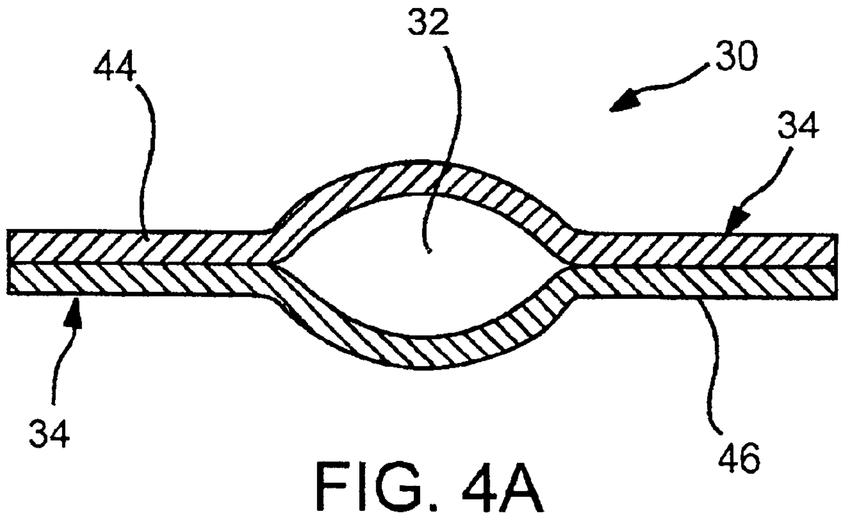
FIGS. 4A and 4B are cross-sectional and planar views, respectively, of another possible embodiment of the liquid containment structure of the present invention having a double-sided, oblong reservoir configuration.
Figure 4B:
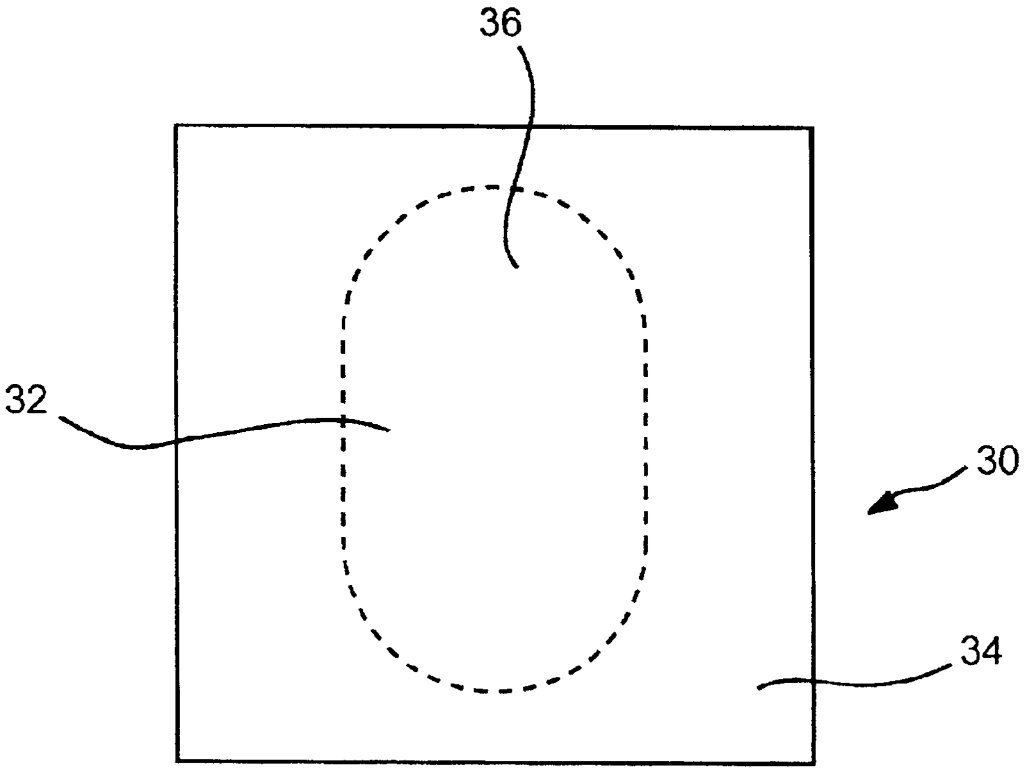

The liquid containment structures of the present invention, such as liquid containment structures 10, 20 and 30, respectively, of FIGS. 2, 3 and 4, provide a compartment or cavity 12, 22 and 32, respectively for holding a single dose of a liquid control solution to be subsequently used. Such compartment or cavity may also be referred to as a cell, cavity, blister, pouch or the like. Each cell has a volume and an opening, both of which may have any suitable shape. For example, in FIG. 2A, a cross-section of a containment structure 10 is provided having a cell 12 having a semicircular cross-section and a semispherical volume. As shown in FIG. 2B, this embodiment has a circular opening 16. In FIG. 3A, containment structure 20 has a cell 22 having a trapezoidal cross-section and a frustum-shaped volume. As shown in FIG. 3B, cell 22 has a square opening 26. In the embodiment of FIG. 4A, containment structure 30 has a cell 32 having an almond or tapered-disk shaped cross-section and volume and, as shown in FIG. 4B, has an oblong shaped opening 36. It is understood that these shapes are exemplary of suitable shapes of the volume, cross-section and openings of the subject cavities, and that any appropriate three-dimensional shape may be employed for the volume and any appropriate two-dimensional shape may be employed for the cross-sectional area and the cavity openings. Additional suitable three dimensional shapes include, but are not limited to, spheres, ellipsoids, paraboloids, cylinders, cones and the like. Additional suitable two-dimensional shapes include, but are not limited to, rectangles, triangles, ellipses, quadrilaterals such as parallelograms, polygons such as pentagons, and the like.

Depending on the application for which the control solution or other agent is being used, the volume of the containment structure reservoirs of the present invention may range from about 100 nL to 200 μL. For control solutions used on test strip sensors for analyte detection and measurement, the reservoir volume typically ranges from about 1 to 20 μL. The opening diameter, width or length dimensions of the cells are typically in the range from about 1 to 10 mm, and more typically in the range from about 2 to 8 mm. Likewise, the depth or thickness of the cells typically range from about 1 to 5 mm, and more typically in the range from about 2 to 3 mm.

The subject containment structures 10, 20 and 30 each further include a frame or base structures 14, 24 and 34 about the perimeter, or at least a portion of the perimeter, of reservoirs 12, 22 and 32, respectively, for providing some rigidity to the containment structure so that it can be handled or held or loaded into a dispenser. Such frame structure 14, 24 and 34 defines a planar surface area extending around the perimeter or opening 16, 26 and 36, respectively, of cells 12, 22 and 32, thereby providing a "tray" like configuration. The planar surface extends from the perimeter of the reservoirs a distance in the range from about 5 to 20 mm, and more typically in the range from about 6 to 10 mm. In order to adequately support a reservoir filled with solution, the surface area of the reservoir should cover about 1 to 50% of the surface area of the liquid containment structure, and more typically about 2 to 20% of the surface area of the liquid containment structure. For glucose concentration analyte measurements, for example, the necessary size of the frame of a control solution containment structure is in the range from about 40 to over 500 $mm^2$, and more typically from about 100 to 150 mm,$^2$ taking into consideration the particular user's ease in handling the containment structure. While the figures illustrate the frame structures as having a square configuration, any suitable shape may be used including, but not limited to, rectangular, triangular, annular, etc.

Materials and Fabrication

The liquid containment structures include two primary layers which are sealed together to define the frame portions of the structure and defining a hermetically sealed liquid reservoir. Such a seal is waterproof and maintains a sterile barrier. Preferably, one layer provides structural rigidity and stability to the containment structure while the other layer is flexible and is penetrable by a microneedle; however, in other embodiments, both layers may be flexible. Where two flexible layers are employed, materials are used such that surface areas of contact between the two flexible layers, which define the frame portion of the containment structure, are sufficiently rigid so as to provide sufficient stability to the containment structure, i.e., the containment structure may be adequately stored, handled and held by a user. While it is preferable that the liquid reservoir cells be formed or provided exclusively within the rigid layer, they may be provided exclusively within the flexible layer or partially within both layers. Where the containment structures are formed of two flexible layers, the reservoir cells may be provided within either or both layers.

The rigid layer is made of a water-impermeable base material or one with a very low water vapor transmission. Suitable materials include but are not limited to thick foil laminate materials and inert plastics such as those disclosed in U.S. Pat. No. 5,272,093 which herein incorporated by reference. Examples of such inert plastics include, but are not limited to, polypropylene, polyvinylidine chloride, acrylonitril-butadiene-styrene terpolymer (ABS), high density polyethylene (HDPE), polyvinyl chloride (PVC), etc. The rigid layer may be exclusively made of an inert plastic material or in combination with a foil layer, wherein the two are laminated together. Where the reservoir is provided in the rigid layer, the reservoir may be created by thermal forming or injection molding or other similar techniques known in the art.

The flexible layer is preferably made of a water barrier polymer film material alone or in combination with a thin foil material wherein the two are laminated together. Suitable materials include those which are commonly used for pharmaceutical and food packaging applications, such as those disclosed in U.S. Pat. Nos. 4,769,261, 6287,612 and 4,678,092, which are herein incorporated by reference. The flexible layer has a thickness which is no greater than the penetration length of a microneedle as described above. Thus, such thickness in no greater than about 1 mm, and typically in the range from about 0.1 to 0.5 mm.

The rigid and flexible layers are bonded together where they interface to form the frame of the liquid containment structure. Suitable bonding techniques include heat sealing, radio frequency (RF), or ultrasonic welding. The bond between the two layers must provide a water barrier over the shelf-life of the package. Of course, prior to bonding the two primary layers, the reservoir(s) are filled with a selected liquid agent, such as a reagent or a control solution. In the case where the test sensor, either optical or electrochemical, is not integrated with a microneedle, the flexible layer can be fabricated with a peelable heat-sealed coating commonly used in medical device packaging. Such a coating is generally formulated from a polyolefin copolymer. The flexible peelable layer is either bonded to the rigid layer or to itself. Prior to use, the flexible layer is peeled open, exposing the control solution and allowing the test sensor to access the solution.

The liquid containment structures 10, 20 and 30 of FIGS. 2A, 2B and 2C, respectively, illustrate various possible pairings of layers which form the structures. Structure 10 of FIG. 2A, for example, is made of a rigid bottom layer 38 in which reservoir 12 is exclusively formed, and a top flexible layer 36 which serves to cover the opening of reservoir 12. Structure 20 of FIG. 2B is similar to structure 10 in that it also provides a rigid bottom layer 40 and a flexible top layer 42 where reservoir 22 is exclusively formed in rigid bottom layer 40. Structure 30 differs, however, in that it is formed from two flexible layers, flexible top layer 44 and flexible bottom layer 46 wherein reservoir 32 is formed by both layers.

Liquid Containment Packs

As mentioned above, the liquid containment structures of the present invention may be provided collectively as a plurality in a pack form wherein two or more containment structures are provided in a contiguous arrangement. More specifically, the containment structures are provided in a pack where each containment structure is contiguous with at least one other containment structure such that at least one side of each containment structure is contiguous with at least other containment structure. While as few as two containment structures may be provided in a pack, typically a greater number is provided in the form of an array of containment structures. Such an array may take the form of a matrix configuration or a strip configuration which may be provided in any suitable size, which size is measured in surface area ($cm^2$) for matrix configurations and in length (cm) for strip configurations. The subject liquid containment structures in the form of matrix arrays may be provided in relatively large numbers, such as for institutional use, which may be described as a “sheet,” or may be provided in relatively small sizes, such as for personal use, which may be described as card-sized to be easily carried on one’s person.

Figure 5A:
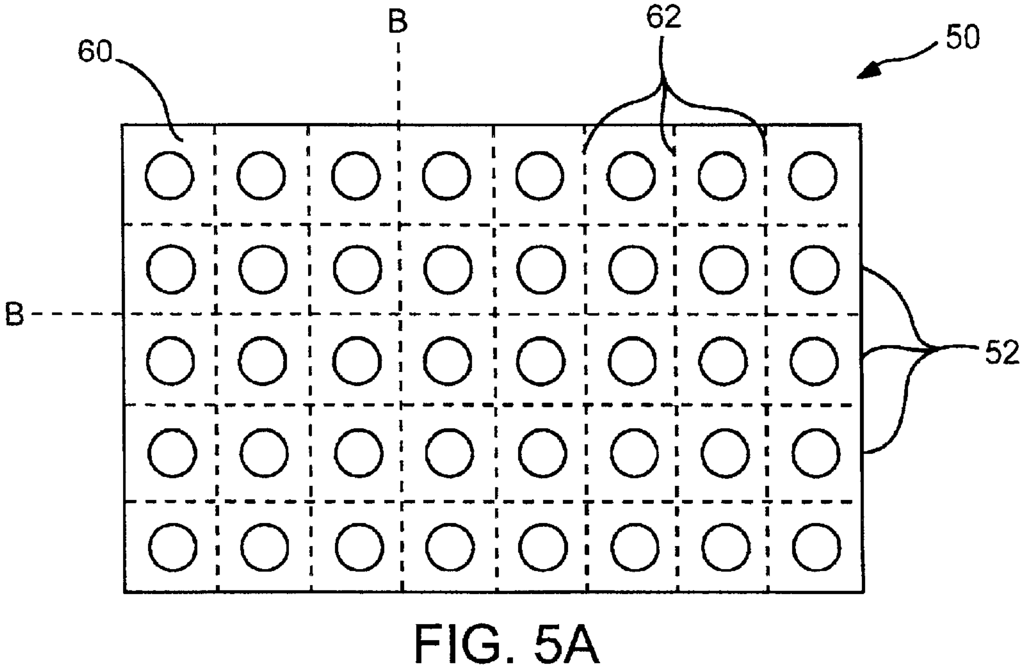
FIG. 5A illustrates a planar sheet embodiment of a packet of liquid containment structures of the present invention having a relatively large number of liquid containment structures.

One such array configuration is illustrated in FIG. 5A wherein a planar array or matrix 50 comprises forty containment structures 52 in a five-by-eight matrix configuration. Such particular configuration, of course, is exemplary as matrix 50 may include fewer or more containment structures 52 depending on such factors as the frequency of analyte testing by a particular user, the user’s desire to carry around a very compact package or, where analyte testing is being performed in mass within a short time period, the number of individuals to which the test is being applied.

For example, typically, it is recommended that a meter be quality control checked periodically in a home setting and daily in a hospital As the average Type I diabetic performs a glucose concentration measurement approximately 4 to 8 times per day, the number of control solution containment structures 52 required on a monthly basis is 5 to 10 depending on the number of vials or packages of new test strip consumed. As such, it would be convenient, as well as assist in the user in tracking the number of control checks that have been made on the meter within a give time period, to provide about 5 to 10 containment structures within a subject pack. As each liquid containment structure has a surface area defined above, such a pack size would range from about 15 to 30 $cm^2$, a size which can be easily fit into a shirt or pant pocket or into purse or brief case. However, where a diabetic is only required to test himself or herself twice per day, he or she may wish to carry a pack having only the number of control solution containment structures which will be used in a month’s time, e.g., about 2 containment structures, so as to limit the wear and tear that the unused containment structures of the pack may undergo if they were carried around for a longer period of time, e.g., several weeks or months.

Figure 5B:
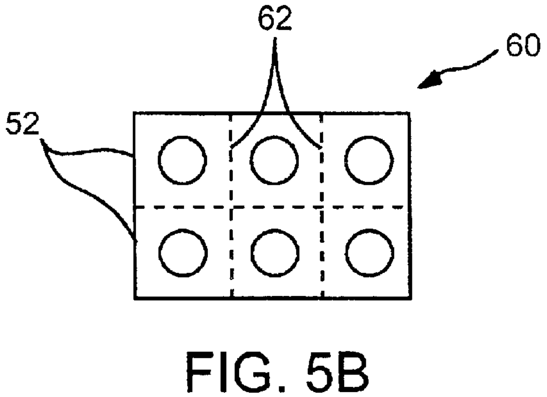
FIG. 5B illustrates another planar sheet embodiment a packet of liquid containment structures of the present invention having a relatively small number of liquid containment structures.
Figure 5C:
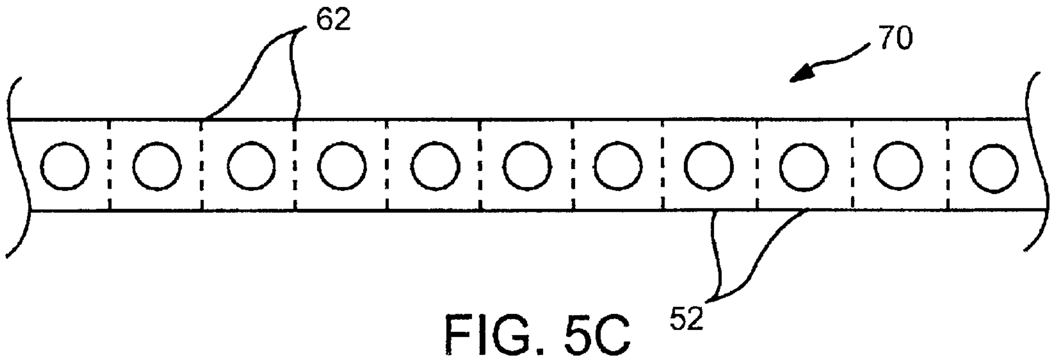
FIG. 5C illustrates a strip embodiment of a packet of liquid containment structures of the present invention.

FIG. 5B illustrates another planar array 60, also in the form of a matrix but having significantly fewer containment structures 52 as that of matrix 50 of FIG. 5A. Here, matrix 60 provides for only six containment structures 52 which may be suitable for the minimal use patient just described above, lasting about 3 months. The embodiment of FIG. 5C provides an array 70 of structures 52 in a strip format wherein only a single row of structures is provided. Strip 70 may have a suitable length providing any number of containment structures 52. When strip 70 is fairly lengthy, it is preferably provided in a rolled form, and most preferably it is provided in a wound or spooled form in a dispenser 80 of FIG. 6 Dispenser 80 may be configured similar to dispensers used for adhesive tapes, postage stamps or dental floss where the user may dispense only what he or she needs or desires. Dispenser 80 may be further configured wherein the used portion of the strip is fed back into dispenser 80, which may be disposed of upon using the last containment structure. Dispenser 80 provides a couple of additional advantages. It protects against damage or wear and tear of the containment pack 70 that might otherwise easily occur without it. Additionally, it minimizes the exposure of the surface of containment pack 70 to the elements thereby minimizing the risk of exposure to germs and dirt. Dispenser 80 is preferably small enough to be carried on the user. The user may choose not to carry the dispenser but, instead, cut or tear off only the number of containment structures he or she anticipates using for the day or week, for example, and store the dispenser for later retrieval.

While certain embodiments of the packet of containment structures have a collective, contiguous frame structure which remains intact until all of the doses of control solution are used, other embodiments of the subject packs provide for the intended and easy separation of containment structures from each other. Specifically, perforations or pre-scored lines are formed between adjacent containment structures after the solution-filled containment structures have been sealed as described above. In the array configurations as described with respect to FIGS. 5A, 5B and 5C, this results in a plurality of rows and/or columns of pre-scored lines 62. With such embodiments, any number of containment structures may be removed from the contiguous array as needed or desired. For example, a single containment structure may be separated from the remaining contiguous plurality just before or just after the use of the control solution in such containment structure. Alternatively, a user may want to remove a day’s or a week’s worth of containment structures, such as an array the size of array 60 defined by lines B—B of FIG. 5A and separately illustrated in FIG. 5B. A pack of this size can be easily and discretely carried by the user.

Subject Systems

The subject systems include a liquid containment structure or pack, as described above, operatively containing a liquid solution for subsequent use.

Such subsequent use includes, but is not limited to, the evaluation of the performance and operation of systems which employ precise amounts or measured single-doses of a liquid. One type of application is in the area of accessing and collecting precise volumes of physiological fluid samples and for analyzing one or more characteristics of the sampled fluid. The subject systems are particularly suited for evaluating the operation of a system for accessing and collecting blood or interstitial fluid samples and for measuring the concentration of one or more analytes of the sampled fluid. The setting of such evaluation may be industrial, e.g., in the manufacturing of such fluid assessment systems, institutional, e.g., in hospitals where such a system is used very frequently, or personal, e.g., for individual who are required to test themselves.

As there are dozens of types of liquids used in various types of applications and settings, it is beyond the scope of this disclosure to list all possible liquids that may be used with the systems of the present invention. However, the subject systems may be used in any applications requiring single-doses of a liquid for frequent or infrequent use. For purposes of describing the subject methods below, the liquid provided by the subject systems is a control solution for the performance evaluation of a system for measuring analyte concentration in a sample of physiological fluid. Examples of such control solutions are disclosed in U.S. Pat. Nos. 5,187,100 and 5,605,837.

Methods of Use

The methods of the present invention are described with respect to the use of the containment structure of FIG. 2A containing a control solution for checking the effectiveness and operation of an analyte concentration measurement system as described above, which system includes an integrated microneedle and test strip sensor and a meter for use with such microneedle/test strip. However, it is understood that the methods apply to any suitable liquid containment structure and liquid containment pack of the present invention.

The subject methods initially involve providing at least one containment structure, either in singulated form or in a pack format. If in a pack format, a target containment structure is selected for the plurality of structures. The target containment structure may be separated or singulated from the pack prior to performing the remainder of the steps, or may be left intact with the remainder of the pack during the analyte measurement procedure and then removed after the procedure has been completed. Alternatively, the used target or selected containment structure may be left intact with the pack and disposed of collectively with the remainder of the containment structures, also kept intact on the pack, until all structures have been used.

Figure 7:
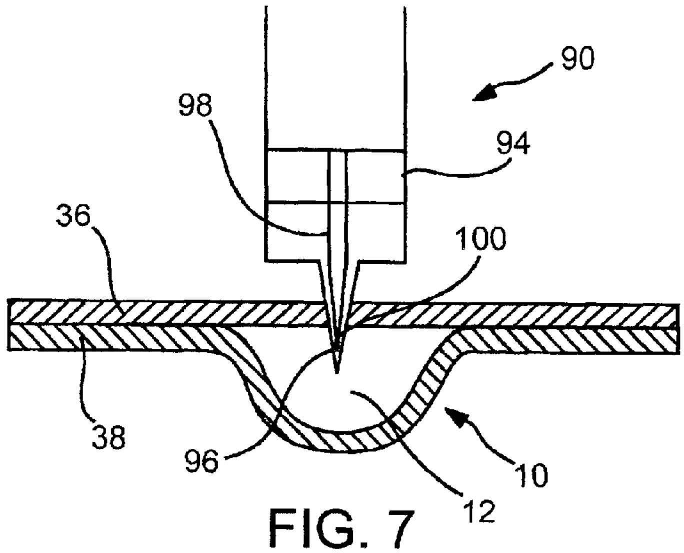
FIG. 7 illustrates use of the liquid containment structure of FIGS. 2A and 2B for evaluating certain functions, features, aspects and/or capabilities of an integrated microneedle/test strip sensor.

The subsequent method steps are now described with reference to FIG. 7. The at least one containment structure 10 having a reservoir 12 filled with control solution may be placed on a level surface or manually held by the user with the flexible side or surface 36 (or one of the flexible sides where the structure has two flexible sides) exposed. The tester to be evaluated or a tester for use with a meter to be evaluated, such as tester 90 is then provided. Tester 90, as mentioned above, includes a test strip 92 having a sensor portion 94, and a microneedle 96 integrated at the distal end of test strip 92. A fluid transfer channel 98 extends from microneedle 92 to within sensor 94. Preferably, tester 90 is provided operatively loaded within a meter (not shown) for the control check; however, tester 90 may be manually held and then inserted into the meter after collection of a dose of control solution. The meter is operatively held and juxtaposed against flexible surface 36 of containment structure 10. The meter is then activated to operatively dispense tester 90 which action causes microneedle 96 to puncture or penetrate through flexible surface or layer 36 into reservoir 12 a determined depth, which depth is sufficient to expose the distal end 100 of channel 98 to the control solution within reservoir 12. Channel 98 then wicks the control solution from within the containment structure 10 and transfers it into the sensor portion 94 of tester 90 where it reacts with the redox reagent system within the sensor's electrochemical cell. The signal produced by this reaction is detected by the meter's electronics and the corresponding analyte concentration value is displayed.

If the analyte concentration results fall outside an expected range (often provided with the instructions of use packaged with the testers or test strips), the control test should be repeated with an unused tester. If the results still fall outside the expected range, the test should be repeated yet a third time but with a tester from a new package of testers. If the third result is outside the expected range, it is likely that there is a problem with the meter, and the user should notify the manufacturer of the problem and request a replacement meter. In addition to control checking the performance of the tester and the meter, the microneedle's effectiveness in puncturing the containment structure is also evaluated. This is done by observing the puncturing of flexible layer 36 of the liquid containment structure by microneedle 96. A desirable puncture is one in which microneedle 96 cleanly and immediately penetrates the layer without hesitation and without tearing or rupturing flexible layer 36 so that the control solution does not leak out prior to being wicked by channel 98. If such a desirable performance is not observed, the test should be performed again with another liquid containment structure from the same pack. If the puncturing is unsuccessful a second time, a containment structure from a new packet should be used for a third test. If a new tester microneedle 96 fails to puncture the flexible layer 36 of the liquid containment structure a third time, a new lot of tester should be used instead. Additionally, the user should notify the manufacturer of the problem and request a replacement test strip lot and control solution containment pack.

Kits

Also provided by the present invention are kits for practicing the subject methods. The kits include at least one liquid containment structure containing a selected liquid solution, but typically include a plurality of containment structures packaged together in a the form of a sheet, card or roll, each containing the selected liquid solution. The kits may further include a disposable or reusable containment structure dispenser. The containment structure(s) contain a control solution selected for the particular application at hand, such as a control solution which mimics blood for evaluating the performance of integrated microneedle/testers and the meter for use therewith. Finally, the kits may include instructions for using the containment structures for control checking or evaluating the performance of the testers and meters described above. These instructions may be present on one or more of the packaging, a label insert, and the like.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A system for use in evaluating the performance of a physiological fluid sampling and analyte concentration measurement system, comprising:

a microneedle having a fluid transfer channel;

at least one containment structure comprising a first layer and a second layer sealed together to form a hermetically sealed cavity there between wherein a surface area of contact between said first and second layers define a frame about a perimeter of said cavity, and wherein said first layer comprises a flexible material, has a thickness in the range from about 0.1 mm to about 1.0 mm and is configured to be penetrable by said microneedle wherein said microneedle is configured to penetrate said first layer without tearing or rupturing said first layer, and wherein said second layer comprises a rigid material; and a control solution contained within said cavity, said control solution configured to mimic said physiological fluid.

2. The system of claim 1 wherein said control solution is provided as a single dose.

3. The system of claim 2 wherein said single dose has a volume in the range from about 100 nL to 200 $\mu$L.

4. The system of claim 3 wherein said single dose has a volume in the range from about 1 to 20 $\mu$L.

5. The system of claim 1 wherein said flexible material is a polymer film.

6. The system of claim 1 wherein said rigid material comprises a plastic material.

7. The system of claim 6 wherein said plastic material comprises one of the group consisting of polypropylene, polyvinylidine chloride, acrylonitril-butadiene-styrene terpolymer (ABS), high density polyethylene (HDPE) and polyvinyl chloride (PVC).

8. The system of claim 1 wherein said rigid material comprises a thick foil laminate.

9. The system of claim 1 wherein said first layer has a thickness in the range from about 0.1 to 0.5 mm.

10. The system of claim 1 wherein said cavity is formed exclusively within said second layer.

11. The system of claim 1 wherein said frame has a surface area in the range from about 40 to over 500 $mm^2$.

12. The system of claim 11 wherein said frame has a surface area in the range from about 100 to 150 $mm_2$.

13. The system of claim 1 further comprising a plurality of said containment structures wherein said structures are contiguous with and separable from each other.

14. The system of claim 13 wherein said structures are separable by means of pre-scored marks formed between said structures.

15. The system of claim 13 wherein said plurality of containment structures are provided in an array configuration.

16. The system of claim 13 wherein said plurality of containment structures is provided in a strip configuration wherein said containment structures are in a serial arrangement.

17. The system of claim 16 wherein said strip of containment structures is provided within a dispenser.

18. The system of claim 13 wherein said plurality of containment structures is provided in a sheet configuration.

19. A method for evaluating the performance of a physiological fluid sampling and analyte concentration measurement system wherein said measurement system includes a tester comprising said microneedle integrated with a sensor and said fluid transfer channel extending from said microneedle to said sensor, said method comprising the steps of:

providing the system of claim 1;

operatively positioning the tester with respect to said at least one containment structure wherein said microneedle is aligned with said cavity;

dispensing said microneedle to penetrate into said cavity; and evaluating the performance of said microneedle in penetrating said cavity.

20. The method of claim 19 further comprising the step of evaluating said sensor's performance in measuring a target analyte concentration of said control solution.

21. The method of claim 19 further comprising the step of evaluating the performance of a meter employed with said tester.

22. A kit for evaluating the performance of a physiological fluid sampling and analyte concentration measurement system, comprising the system of claim 1.

23. The kit of claim 22 further comprising instructions for using said system.

* * * * *